(12) United States Patent
Fowler (10) Patent No.: US 11,389,844 B2
(45) Date of Patent: Jul. 19, 2022

(54) BLISTER PACK DISPOSAL SYSTEM

(71) Applicant: Verde Environmental Technologies, Inc., Minnetonka, MN (US)

(72) Inventor: William V. Fowler, Minneapolis, MN (US)

(73) Assignee: Verde Environmental Technologies, Inc., Minnetonka, MN (US)

( * ) Notice: Subject to any disclaimer, the term of this patent is extended or adjusted under 35 U.S.C. 154(b) by 220 days.

(21) Appl. No.: 16/174,677

(22) Filed: Oct. 30, 2018

(65) Prior Publication Data

US 2019/0291152 A1  Sep. 26, 2019

Related U.S. Application Data

(60) Provisional application No. 62/678,911, filed on May 31, 2018, provisional application No. 62/645,700, filed on Mar. 20, 2018.

(51) Int. Cl.
| | | |
|---|---|---|
| *B09B 1/00* | (2006.01) | |
| *B09B 3/00* | (2022.01) | |
| *A61J 1/03* | (2006.01) | |
| *B09B 101/65* | (2022.01) | |

(52) U.S. Cl.
CPC ............... *B09B 3/00* (2013.01); *A61J 1/035* (2013.01); *B09B 3/0075* (2013.01); *B09B 2101/65* (2022.01)

(58) Field of Classification Search
CPC .......................... B09B 3/0075; B09B 2101/65
See application file for complete search history.

(56) References Cited

U.S. PATENT DOCUMENTS

| | | |
|---|---|---|
| 4,000,846 A | 1/1977 | Gilbert |
| 4,588,580 A | 5/1986 | Gale et al. |
| 4,738,817 A * | 4/1988 | Wittwer ............ B29C 66/14 |
| | | 264/328.14 |
| 4,830,643 A | 5/1989 | Sassa et al. |
| 4,853,226 A | 8/1989 | Machida et al. |
| 4,909,256 A | 3/1990 | Peck |
| 4,928,681 A | 5/1990 | Langston et al. |
| 5,019,254 A | 5/1991 | Abrevaya et al. |
| 5,022,553 A | 6/1991 | Pontius |
| 5,149,538 A | 9/1992 | Granger et al. |
| 5,234,957 A | 8/1993 | Mantelle |
| 5,236,714 A | 8/1993 | Lee et al. |

(Continued)

FOREIGN PATENT DOCUMENTS

| | | |
|---|---|---|
| EP | 1619136 A2 | 1/2006 |
| JP | S49130472 U | 11/1974 |

(Continued)

OTHER PUBLICATIONS

Greensher et al., Ascendency of the black bottle (activated charcoal), Pediatrics (1987), 80(6):949-951.

(Continued)

*Primary Examiner* — Janine M Kreck
(74) *Attorney, Agent, or Firm* — Bret E. Field; Bozicevic, Field & Francis LLP (57) ABSTRACT

Compositions comprising a blister pack, a container dimensioned to hold the blister pack and a pharmacological agent activity mitigation component are provided. Also provided are methods of making and using the compositions.

5 Claims, 1 Drawing Sheet

(56) References Cited

U.S. PATENT DOCUMENTS

| | | | |
|---|---|---|---|
| 5,259,499 A | 11/1993 | Boettger | |
| 5,396,901 A | 3/1995 | Philips | |
| 5,468,447 A | 11/1995 | Bermas | |
| 5,597,617 A | 1/1997 | Deliso et al. | |
| 5,804,215 A | 9/1998 | Cubbage | |
| 5,899,856 A | 5/1999 | Schoendorfer et al. | |
| 6,024,012 A | 2/2000 | Luzenberg, Jr. | |
| 6,261,595 B1 | 7/2001 | Stanley et al. | |
| 6,261,596 B1 | 7/2001 | Li et al. | |
| 6,279,736 B1 | 8/2001 | Hekal | |
| 6,449,990 B1 | 9/2002 | Kawajiri et al. | |
| 6,660,901 B2 | 12/2003 | Church | |
| 7,431,863 B2 | 10/2008 | Pickens | |
| 7,704,598 B2 | 4/2010 | Jain et al. | |
| 7,867,511 B2 | 1/2011 | Anderson et al. | |
| 7,918,776 B2 | 4/2011 | Day | |
| 8,329,212 B2 | 12/2012 | Anderson et al. | |
| 8,365,504 B2 * | 2/2013 | Tampieri | B65B 61/20 53/447 |
| 8,445,010 B2 | 5/2013 | Anderson et al. | |
| 8,475,837 B2 | 7/2013 | Anderson et al. | |
| 8,535,711 B2 | 9/2013 | Anderson et al. | |
| 8,979,724 B2 * | 3/2015 | Fowler | B09B 3/0075 588/249.5 |
| 9,988,595 B2 | 6/2018 | Brandt-Sanz et al. | |
| 2002/0150606 A1 | 10/2002 | Yamada | |
| 2002/0187183 A1 | 12/2002 | Becher et al. | |
| 2003/0068392 A1 | 4/2003 | Sackler | |
| 2003/0078552 A1 | 4/2003 | Tepper et al. | |
| 2004/0013716 A1 | 1/2004 | Gale et al. | |
| 2004/0033255 A1 | 2/2004 | Baker et al. | |
| 2004/0109886 A1 | 6/2004 | Rigby | |
| 2004/0126323 A1 | 7/2004 | Shevchuk et al. | |
| 2004/0146547 A1 | 7/2004 | Marcenyac et al. | |
| 2004/0241218 A1 | 12/2004 | Tavares et al. | |
| 2005/0035041 A1 | 2/2005 | Nohren, Jr. et al. | |
| 2005/0037059 A1 | 2/2005 | Miller, II | |
| 2005/0070835 A1 | 3/2005 | Joshi | |
| 2005/0112068 A1 | 5/2005 | Warner et al. | |
| 2005/0163717 A1 | 7/2005 | Anderson et al. | |
| 2005/0211099 A1 | 9/2005 | Doughty et al. | |
| 2005/0266228 A1 | 12/2005 | Jain et al. | |
| 2006/0110080 A1 | 5/2006 | Thomas et al. | |
| 2006/0260973 A1 | 11/2006 | Macinnes et al. | |
| 2007/0122463 A1 | 5/2007 | Ko | |
| 2007/0250339 A1 | 10/2007 | Mallett et al. | |
| 2008/0274168 A1 | 11/2008 | Baker et al. | |
| 2009/0131732 A1 | 5/2009 | Day | |
| 2009/0134054 A1 * | 5/2009 | Lee | B65B 9/04 206/531 |
| 2009/0180936 A1 | 7/2009 | Anderson et al. | |
| 2010/0068250 A1 | 3/2010 | Anderson et al. | |
| 2010/0083963 A1 | 4/2010 | Wharton et al. | |
| 2011/0066130 A1 | 3/2011 | Anderson et al. | |
| 2011/0092926 A1 | 4/2011 | Anderson et al. | |
| 2011/0272428 A1 * | 11/2011 | Ziemba | A61J 1/035 221/25 |
| 2012/0024724 A1 | 2/2012 | Beardsall et al. | |
| 2012/0088951 A1 | 4/2012 | Deryck et al. | |
| 2013/0233748 A1 | 9/2013 | Anderson et al. | |
| 2014/0187842 A1 * | 7/2014 | Holaday | B09B 3/0075 588/313 |
| 2015/0265867 A1 | 9/2015 | Sarangapani | |
| 2016/0361667 A1 | 12/2016 | Chavan et al. | |
| 2018/0001357 A1 * | 1/2018 | Schestopol | A61J 1/03 |

FOREIGN PATENT DOCUMENTS

| | | |
|---|---|---|
| JP | S61171537 A | 8/1986 |
| JP | H0285182 A | 3/1990 |
| JP | H11276887 A | 10/1999 |
| JP | 2000206111 A | 7/2000 |
| JP | 2001000774 A | 1/2001 |
| JP | 2001348577 A | 12/2001 |
| JP | 3097492 U | 1/2004 |
| JP | 2005502391 A | 1/2005 |
| JP | 2005538058 A | 12/2005 |
| JP | 2007518819 A | 7/2007 |
| JP | 2008500205 A | 1/2008 |
| JP | 2009023668 A | 2/2009 |
| WO | WO9414062 A1 | 6/1994 |
| WO | WO0029311 A1 | 5/2000 |
| WO | WO02085268 A1 | 10/2002 |
| WO | WO02087482 A1 | 11/2002 |
| WO | WO02094779 A2 | 11/2002 |
| WO | WO02098765 A1 | 12/2002 |
| WO | WO03103673 A1 | 12/2003 |
| WO | WO2005070003 A2 | 8/2005 |
| WO | WO2005118280 A1 | 12/2005 |
| WO | WO2009019668 A2 | 2/2009 |
| WO | WO2010110837 A1 | 9/2010 |
| WO | WO2013049380 A1 | 4/2013 |
| WO | WO2013049387 A1 | 4/2013 |
| WO | WO2014102614 A2 | 7/2014 |

OTHER PUBLICATIONS

Disposal Options for Expired or Surplus Medications/Pharamceuticals, Technical Guidance Document SW 07-1, Kansas Department of Health and Environment, 2 pg., Mar. 22, 2007.

Living On Earth.org., "Living on Earth: What Goes Down Comes Around", online interview with the Environmental Protection Agency, Oct. 3, 2008, 3 pages.

Marquardt et al., Fentanyl remaining in a transdermal system following three days of continuous use Ann Pharmacother (1995), 29:969-971.

Sassaman et al., Air Force Print News Today, Prevent Placing Pharmaceuticals in Travis Water System, Mar. 24, 2008.

Stoppler, "Expired Medication Disposal: The "Green" way to dispose of old or unused medications", eMedicineHealth.com, Mar. 21, 2008, 1 pg.

Yerasi et al., Disposal of used fentanyl patches, Am J Health Syst Pharm (1997), 54:85-86.

Whisper EX Aquarium Carbon Filter Cartridges, http://www.tetra-fish.com/Products/whisper-aquarium-power-filter-cartridges/whisper-ex-aquarium-carbon-filter-cartridges.aspx printed Sep. 3, 2014.

Whisper EX Filtration Systems, https://web.archive.org/web/20090120011243/http://tetra-fish.com/sites/TetraFish/aquarium/AquariumContentTwoColumn.aspx?id=2416 Printed Sep. 3, 2014.

Zambaux et al., Validation of a method to inactivate fentanyl in the used devices of Durogesic, Ann Pharm Fr (2000), 58:176-179.

Zoraflex ACC, 100% Activated Woven Carbon Cloth, Calgon Carbon Corporation, 2008, 2pg.

* cited by examiner

BLISTER PACK DISPOSAL SYSTEM

CROSS-REFERENCE TO RELATED APPLICATIONS

Pursuant to 35 U.S.C. § 119 (e), this application claims priority to the filing date of U.S. Provisional Patent Application Ser. No. 62/645,700 filed on Mar. 20, 2018 and U.S. Provisional Patent Application Ser. No. 62/678,911 filed May 31, 2018; the disclosure of which application is herein incorporated by reference.

INTRODUCTION

The temptation and potential for prescription drug abuse by ingestion, injection, etc., and particularly, of narcotics and other controlled substances is well known. This widespread abuse issue is exemplified by the current problems associated with morphine, oxycontin, fentanyl, and many others.

Unfortunately, problems associated with medications are not limited to abusable narcotics. According to a recent investigative report by the Associated Press, Americans flush 250 million pounds of pharmaceuticals down the drain every year (reference: Living on Earth.org online interview with the EPA, Oct. 3, 2008). Furthermore, this practice of pharmaceutical composition disposal has resulted in contamination of the drinking water supply of numerous major cities throughout the U.S. (See e.g., Air Force Print News Today, Mar. 24, 2008).

These contaminants pose risk to the environment; affecting people, fish and wildlife. Potential problems include abnormal physiological processes, reproductive impairment, increased evidence of cancer, and development of anti-microbial resistant organisms (See e.g., Kansas Dept of Health and Environment, Mar. 22, 2007). A significant source of pharmaceutical environmental contamination lies with disposal of unused or expired medications (See e.g., eMedicineHealth Mar. 21, 2008). Historically, these medications are flushed down the toilet or thrown into the trash, with a likely outcome that they will eventually end up in groundwater supplies. The only medications that the FDA condones flushing down the toilet are controlled substances with abuse potential. Thus, many people are faced with a dilemma of how best to dispose of unused and expired medication.

SUMMARY

Compositions comprising a blister pack, a container dimensioned to hold the blister pack and a pharmacological agent activity mitigation component are provided. Also provided are methods of making and using the compositions.

DETAILED DESCRIPTION

Compositions comprising a blister pack, a container dimensioned to hold the blister pack and a pharmacological agent activity mitigation component are provided. Also provided are methods of making and using the compositions.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various embodiments of the invention, aspects of the compositions are reviewed first in greater detail, followed by a detailed description of embodiments of using and making the compositions, as well as a review of kits that include the compositions and/or components thereof.

Compositions

As summarized above, aspects of the invention include compositions that include a blister pack, a container dimensioned to hold the blister pack and a pharmacological agent activity mitigation component. Each of these components is now reviewed in greater detail.

Blister Pack

As summarized above, a component of compositions according to embodiments of the invention is a blister pack. The phrase "blister pack" is used herein in its conventional sense to refer to a pharmaceutical composition package that includes one or more individually sealed containers each containing a pharmaceutical composition. Aspects of blister packs include a first blister component defining one or more pharmaceutical composition containers in the form of blisters (i.e., compartments, e.g., in the form of pockets, wells, cavities, etc.) and a second backing component that, when complexed with the blister component, serves to seal the interior of the blister(s) and contents thereof, e.g., pharmaceutical compositions, from the external environment. The blister component may include one or more compartments as desired, where the number ranges in some instances from 1 to 100, such as 2 to 50, including 5 to 25 blisters. The blister component of the blister pack may be fabricated from any convenient material, wherein in some instances the blister component is fabricated from a formable web material, such as a transparent polymeric material, e.g., polyvinyl chloride (PVC), where the web material may include one or more additional polymeric layers (e.g., where the web materials is laminate) where such additional polymeric materials may include Polyvinylidene chloride (PVDC), Polychlorotrifluoro ethylene (PCTFE) and Cyclic olefin copolymers (COC) or polymers (COP). Blister components may also be fabricated from cold form foil, such a 3-layer laminate: PVC/Aluminum/Polyamide. The backing component may be fabricated from any convenient material, such as a paperboard or a lidding foil, e.g., a hard temper aluminum, which may or may not be coated with a heat-seal lacquer on the inside and/or a print primer on the outside.

In some embodiments, the blister pack may include a water-soluble component, e.g., a water-soluble blister component and/or water-soluble backing component. Any convenient water-soluble material may be employed. Examples of water-soluble materials that may be employed include polymers and compositions thereof, where such polymers may be water soluble starches or modified starch polymers, soluble polyesters or polyvinyl alcohol or blends of these polymers with natural polymers such as starch or modified starch. Where desired, optional film additives for providing various functionalities may be included. The film composition and film can thus contain one or more auxiliary film agents and processing agents, such as, but not limited to, plasticizers, lubricants, release agents, fillers, extenders, antiblocking agents, detackifying agents, antifoams and other functional ingredients, in amounts suitable for their intended purpose. Specific optional additives that may be present include gelatin, lecithin, such as sunflower lecithin, sorbitol, glycerol, propylene glycol, polysorbate 80, sodium lauryl sulfate, and combinations thereof. Further details regarding water-soluble materials and blister pack components fabricated therefrom are provided in U.S. Patent Application Publication Nos. 2006/0260973 and 2009/0134054, the disclosures of which are herein incorporated by reference.

As indicated above, one or more blisters (i.e., compartments) of the blister pack may include a pharmaceutical composition present therein. The nature of the pharmaceutical composition may vary, as desired. The dosage forms of the pharmaceutical compositions, e.g., tablets, which can be present in compartments of the blister pack, are not at all limited by the type of tablet or the type of active pharmaceutical ingredient ("API") used therein. These API's include, without limitation, analgesics, anti-inflammatories, antipyretics, antibiotics, antimicrobials, anxiolytics, laxatives, anorexics, antihistamines, antidepressants, antiasthmatics, antidiuretics, antiflatuents, antimigraine agents, antispasmodics, sedatives, antihyperactives, antihypertensives, tranquilizers, decongestants, beta blockers, peptides, proteins, oligonucleotides and other substances of biological origin, and combinations thereof. Also contemplated are the drugs and pharmaceutically active ingredients described in Mantelle, U.S. Pat. No. 5,234,957, in columns 18 through 21. That text of Mantelle is hereby incorporated by reference. Any of the forgoing API's can be used in the form of any salt, hydrate, solvate, polymorph, or individual optical isomer, and any mixture thereof.

In some instances, the pharmaceutical composition includes, opiates, drugs used to treat pain, drugs used in psychiatry or in the treatment of schizophrenia, such as clozapine and cytotoxic substances are particularly preferred. Legal opiates which may be packaged according to the invention include prescription drugs such as, without limitation, alfentanil, alphaprodine, anileridine, benzylmorphine, bezitramide, buprenorphine, butorphanol, clonitazene, codeine, codeine phosphate, desomorphine, dextromoramide, dezocine, diampromide, dihydrocodeine, dihydrocodeinone enol acetate, dihydromorphine, dimenoxadol, dimepheptanol, dimethylthiambutene, dioxaphetyl butyrate, dipipanone, eptazocine, ethoheptazine, ethylmethylthiambutene, ethylmorphine, etonitazene, fentanyl, hydrocodone, hydromorphone, hydroxypethidine, isomethadone, ketobemidone, levorphanol, lofentanil, meperidine, meptazinol, metazocine, methadone, metopon, morphine, morphine hydrochloride, morphine sulfate, myrophine, nalbuphine, narceien, nicomorphine, norlevorphanol, normethadone, normorphine, norpipanone, opium, oxycodone, oxymorphone, papveretum, pentazocine, phenadoxone, phenazocine, phenoperidine, piminodine, piritramide, proheptazine, promedol, propirm, propoxyphene, remifentanil, sufentanil and tilidine. The class of compounds generally known as opiates also includes illicit drugs such as heroin and cocaine. Opiates in accordance with the present invention include those identified above as well as any listed as controlled substances pursuant to 21 C.F.R. § 1308.12. Opiates are given to patients for a variety of reasons, most frequently for pain mitigation of one type or another.

In some instances, the pharmaceutical composition includes a cytotoxic substance, i.e., an agent that kills cells. These substances are generally used in the treatment of malignant and other diseases. They are designed to destroy rapidly growing cancer cells. They have been shown to be mutagenic, carcinogenic and/or teratogenic, either in treatment doses or animal and bacterial assays. Cytotoxic drugs that interfere with critical cellular processes including DNA, RNA, and protein synthesis, have been conjugated to antibodies and subsequently used for in vivo therapy. Such drugs, include, but are not limited to: i) intercalating agents, in particular doxorubicin (Adriamycin), daunorubicin, epirubicin, idarubicin, zorubicin, aclarubicin, pirarubicin, acridine, mitoxanthrone, actinomycin D, eptilinium acetate; ii) alkylating agents chosen from platinum derivatives (cisplatin, carboplatin, oxaliplatin); iii) a compound chosen from the other groups of alkylating agents: cyclophosphamide, ifosfamide, chlormetrine, melphalan, chlorambucil, estramustine, busulfan, mitomycin C, nitrosoureas: BCNU (carmustine), CCNU (lomustine), fotemustine, streptozotocin, triazines or derivatives: procarbazine, dacarbazine, pipobroman, ethyleneimines: altretamine, triethylene-thio-phosphoramide, iv) a compound chosen from the other groups of anti-metabolic agents: antifolic agents: methotrexate, raltitrexed, antipyrimidine agents: 5-fluorouracil (5-FU), cytarabine (Ara-C), hydroxyurea antipurine agents: purinethol, thioguanine, pentostatin, cladribine, cytotoxic nucleoside synthesis inducers: gemcitabine, v) a compound chosen from the other groups of tubulin-affinity agents, vinca alkaloids which disrupt the mitotic spindle: vincristine, vinblastine, vindesine, navelbine, agents which block the depolymerization of the mitotic spindle: paclitaxel, docetaxel, agents which induce DNA cleavage by inhibition of topoisomerase II: etoposide, teniposide, topoisomerase I inhibitors which induce DNA cleavage: topotecan, irinotecan, vi) a DNA splitting or fragmenting agent, such as bleomycin, vii) one of the following compounds: plicamycin, L-asparaginase, mitoguazone, dacarbazine, viii) an anticancer progestative steroid; medroxy-progesterone, megestrol, ix) an anticancer estrogen steroid: diethylstilbestrol; tetrasodium fosfestrol, x) an antiestrogen agent: tamoxifen, droloxifen, raloxifen, aminoglutethimide, xi) a steroidal antiandrogenic agent (e.g. cyproterone) or a non-steroidal antiandrogenic agent (flutamide, nilutamide).

In addition to the API's mentioned herein, the dosage forms present in the compartments of the blister packs can, in addition or instead, include vitamins, minerals and dietary supplements. As used in this disclosure, the term "vitamin" refers to trace organic substances that are required in the diet. For the purposes of the present invention, the term "vitamin(s)" includes, without limitation, thiamine, riboflavin, nicotinic acid, pantothenic acid, pyridoxine, biotin, folic acid, vitamin B.sub.12, lipoic acid, ascorbic acid, vitamin A, vitamin D, vitamin E and vitamin K. Also included within the term "vitamin" are the coenzymes thereof. Coenzymes are specific chemical forms of vitamins. Coenzymes include thiamine pyrophosphates (TPP), flavin mononucleotide (FMM), flavin adenine dinucleotide (FAD), Nicotinamide adenine dinucleotide (NAD), Nicotinamide adenine dinucleotide phosphate (NADP), Coenzyme A (CoA), pyridoxal phosphate, biocytin, tetrahydrofolic acid, coenzyme B.sub.12, lipoyllysine, 11-cis-retinal, and 1,25-dihydroxycholecalciferol. The term "vitamin(s)" also includes choline, carnitine, and alpha, beta, and gamma carotenes. The term "mineral" refers to inorganic substances, metals, and the like required in the human diet. Thus, the term "mineral" as used herein includes, without limitation, calcium, (calcium carbonate), iron, zinc, selenium, copper, iodine, magnesium, phosphorus, chromium and the like, and mixtures thereof. The term "dietary supplement" as used herein means a substance which has an appreciable nutritional effect when administered in small amounts. Dietary supplements include, without limitation, such ingredients as bee pollen, bran, wheat germ, kelp, cod liver oil, ginseng, and fish oils, amino-acids, proteins and mixtures thereof. As will be appreciated, dietary supplements may incorporate vitamins and minerals.

In general, the amount of active ingredient incorporated in each dosage form, such as a tablet, may be selected according to known principles of pharmacy. An effective amount of API is specifically contemplated. By the term "effective amount," it is understood that, with respect, to for example, a "pharmaceutically effective amount" is contemplated. A "pharmaceutically effective amount" is the amount or quantity of a drug or API which is sufficient to elicit the required or desired therapeutic response, or in other words, the amount which is, sufficient to elicit an appreciable biological response when administered to a patient. As used with reference to a vitamin or mineral, the term "effective amount" means an amount at least about 10% of the United States Recommended Daily Allowance ("RDA") of that particular ingredient for a patient. For example, if an intended ingredient is vitamin C, then an effective amount of vitamin C would include an amount of vitamin C sufficient to provide 10% or more of the RDA. Typically, where the tablet includes a mineral or vitamin, it will incorporate higher amounts, preferably about 100% or more of the applicable RDA.

The amount of active ingredient used can vary greatly. Of course, the size of the dosage form, the requirements of other ingredients, and the number of, for example, tablets which constitute a single dose will all impact the upper limit on the amount of pharmacologically active ingredient which can be used. In some instances, the active ingredient may be provided in an amount of between greater than zero and about 80% by weight of the finished tablet and, such as in a range of between greater than zero and about 60% by weight thereof. Put in other terms, the active ingredient can be included in an amount of between about 1 microgram to about 2 grams, such as between about 0.01 and about 1000 milligrams per dosage form, i.e., per tablet.

Container

Aspects of the compositions include a container. The container may have any convenient configuration. In some instances, the container is dimensioned to accommodate a blister pack, e.g., as described above, and a pharmacological agent activity mitigation component, e.g., as described in greater detail below. Configurations of interest for the container include, but are not limited to, bottles, bags, pouches, boxes, etc., where the walls of the container may be rigid or flexible, as desired. In those embodiments where the containers are dimensioned to accommodate a blister pack, the interior volume of the container will be such that the blister pack can be positioned inside of the container, where in some instances when the blister pack is placed inside of there is also additional space to accommodate a volume of liquid, e.g., from 50 to 500 ml of liquid or more. Accordingly, the volume of the container may range in some instances from 50 to 500 ml, such as 100 to 400 ml, including 200 to 375 ml. Where the container has a pouch or bag configuration, the dimensions of such may vary, ranging in some instances from 2×3 inches to 8×10 inches. While the thickness of the walls of the container may vary, in some instances the walls have a thickness ranging from 0.1 to 2.0 mm, such as 0.1 to 1.0 mm. The container may be fabricated from any convenient material that is impermeable to liquid, e.g., an aqueous liquid, where materials of interest include polymeric materials (e.g., polyvinylchloride, polyethylene, polyvinylacetate, etc.) which materials may be transparent, translucent or opaque, as desired.

In some instances, the container is sealable. Accordingly, the container includes a sealable closure device (e.g., a resealable closure device), which when opened provides access to deposit the pharmaceutical composition into the container. The sealable closure device for closing the container or pouch also provides a closed system for disposing of the used medication. The closure system may include an adhesive seal or plastic container reseal device such as those associated with the trademark ZIPLOC® to seal the pharmaceutical composition in the container.

Where desired, the container may include a vent. The vent may have any configuration that allows for passage of gas generated during use of the device from the inside to the outside of the container. Vents of interest include one way gaseous vents which allow for passage of gas from inside the container to outside of the container but not vice versa, such as vents typically found in coffee bags, e.g., as described in U.S. Pat. No. 4,000,846.

Pharmacological Agent Activity Mitigation Component

As summarized above, in addition to the blister pack and container, compositions of the invention further include a pharmacological agent activity mitigation component. The phrase "pharmaceutical agent activity mitigation component" refers to an entity, e.g., composition of matter, that, when contacted with a pharmaceutical composition (e.g., by mixing, etc.) reduces the effective activity of the API present in a pharmaceutical composition. The mechanism of reduction may vary, where the mechanism may include one or more of destruction, deactivation, sequestration, combination with irritant, etc., depending on the nature of the pharmacological agent activity mitigation component.

Any convenient pharmacological agent activity mitigation component may be employed. In some instances, the pharmacological activity mitigation component is an adsorbing agent. Adsorbing agents are agents that serve to tie up or bind the API from the pharmaceutical composition so that the API is no longer accessible. Adsorbing agents are agents that provide a surface to which the API may adhere in a stable fashion such that it is no longer available. Any convenient adsorbing agent may be employed. In some instances, the adsorbing agent is activated carbon. Activated carbon is suitable for the adsorption or chemisorption of active agents. The term "activated carbon" is used in its conventional sense to refer to a form of carbon that has been processed to provide for a high surface area, where in some instances the surface are is 500 m$^2$ or greater, such as in excess of 500 m$^2$, where in some instances the surface area is 1,000 m$^2$ or greater, such as 1,500 m$^2$ or greater, including 2,000 m$^2$ or greater, 2,500 m$^2$ or greater, and in some instances 3,000 m$^2$ or greater. When present as the binding agent, the activated carbon may be in powder, granular or pelletized form, among other configurations of interest. Powdered activated carbon is a particular carbon composition having an average particle size of 0.25 mm or less, e.g., from 0.15 to 0.25 mm, while granular or pelletized activated carbon is made up of particles or pellets having an average size of 0.25 mm or higher, such as from 0.25 to 5.0 mm. In some instances, in which the activated carbon is present in powder form (as well as other forms), the activated carbon may not be free-flowing in the container, i.e., the activated carbon may be stably associated with another component of the container, e.g., a wall of the container, a solid support in the container, or a pouch inside of the container, such as described in greater detail below. In yet other instances where the activated carbon is present in granular or pelletized form, the granular or pelletized form of the activated carbon may be free-flowing in the container. Activated carbon may be obtained from any convenient source, including but not limited to: Cabot corporation, Calgon Carbon, Jacobi Carbon and the like. When employed, the amount of activated carbon may vary, ranging in some instances from 2 to 15 grams carbon for every gram of organics to be adsorbed, such as 3 to 10 grams carbon for every gram of organics to be adsorbed.

As indicated above, where desired activated carbon may be present in a pouch or analogous container, such as when present is pod form. In such instances, an amount of activated carbon is encased in a polymeric film, where in some instances the film is a water-soluble film. The amount of activated carbon encased in a polymeric film may vary, ranging in some instances from 2 to 200 grams, such as 5 to 100 grams. The pods may have any convenient shape, where the shape may be chosen so as to fit easily within the container. In some instances, the pods have a longest dimension, e.g., length, width, height, ranging from 1 to 50 cm, such as 2 to 30 cm, including 5 to 25 cm. The water-soluble film may have any convenient thickness, where in some instances the film has a thickness of from 20 to 200 microns, such as 35 to 150 microns, including 50 to 125 microns, e.g., 75 to 100 microns. Different film material and/or films of different thickness may be employed in making carbon pods employed in embodiments of the invention. Films of interest for use in carbon pods employed in embodiments of the invention may exhibit good dissolution in cold water, meaning unheated distilled water. In some instances, the employed films exhibit good dissolution at temperatures 24° C. or lower, such as 10° C. or lower. By good dissolution it is meant that the film exhibits water-solubility of 50% or more, such as 75% or more, including 95% or more, e.g., as determined using the protocol described in U.S. Pat. No. 9,988,595; the disclosure of which is herein incorporated by reference. Any convenient film material may be employed, where in some instances the material is a polymeric material, e.g., which can be obtained by casting, blow-molding, extrusion, or blown extrusion of the polymeric material, etc. Polymeric materials (including copolymer materials, terpolymer materials, or derivatives thereof) suitable for use as film material may be selected from a variety of different materials, including but not limited to polyvinyl alcohols (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. In some instances, the polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and including polyvinyl alcohols, polyvinyl alcohol copolymers and hydroxypropyl methyl cellulose (HPMC), and combinations thereof. In some instances, the level of polymer in the film material, for example a PVA polymer, is 60% or more. The polymer can have any weight average molecular weight which varies, ranging in some instances from 1000 to 1,000,000, such as from 10,000 to 300,000, and including from 20,000 to 150,000. Mixtures of polymers can also be used as the film material. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000 to about 40,000, such as about 20,000, and of PVA or copolymer thereof, with a weight average molecular weight of about 100,000 to about 300,000, such as about 150,000. Also suitable herein are polymer blend compositions, for example comprising hydrolytically degradable and water-soluble polymer blends such as polylactide and polyvinyl alcohol, obtained by mixing polylactide and polyvinyl alcohol, e.g., comprising about 1-35% by weight polylactide and about 65% to 99% by weight polyvinyl alcohol. In some instances, the polymer is a polyvinyl alcohol, e.g., which may be from about 60% to about 99% hydrolyzed, such as from about 80% to about 99% hydrolyzed, including from about 80% to about 90% hydrolyzed, e.g., to improve the dissolution characteristics of the material. Films of interest that may be employed in carbon pods of the invention include those supplied by Monosol (Merrillville, Ind., USA) under the trade references M8630, M8900, M8779, M8310, M9467, and PVA films of corresponding solubility and deformability characteristics. Other suitable films may include called Solublon®PT, Solublon®GA, Solublon®KC or Solublon®KL from the Aicello Chemical Europe GmbH, the films VF-HP by Kuraray, or the films by Nippon Gohsei, such as Hi Selon. Suitable films also include those supplied by Monosol for use in the following Procter and Gamble products: TIDE PODS, CASCADE ACTION PACS, CASCADE PLATINUM, CASCADE COMPLETE, ARIEL 3 IN 1 PODS, TIDE BOOST ORIGINAL DUO PACs, TIDE BOOST FEBREZE SPORT DUO PACS, TIDE BOOST VIVID WHITE BRIGHT PACS, DASH, FAIRY PLATINUM. In some instances, the water-soluble films are those derived from a resin that comprises a blend of polymers, such as wherein at least one polymer in the blend is polyvinyl alcohol. In some instances, the water-soluble film resin comprises a blend of PVA polymers. For example, the PVA resin can include at least two PVA polymers, wherein as used herein the first PVA polymer has a viscosity less than the second PVA polymer. A first PVA polymer can have a viscosity of at least 8 centipoise (cP), 10 cP, 12 cP, or 13 cP and at most 40 cP, 20 cP, 15 cP, or 13 cP, for example in a range of about 8 cP to about 40 cP, or 10 cP to about 20 cP, or about 10 cP to about 15 cP, or about 12 cP to about 14 cP, or 13 cP. Furthermore, a second PVA polymer can have a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP. The viscosity of a PVA polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in cP should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution. The individual PVA polymers can have any suitable degree of hydrolysis, as long as the degree of hydrolysis of the PVA resin is within the ranges described herein. Optionally, the PVA resin can, in addition or in the alternative, include a first PVA polymer that has a Mw in a range of about 50,000 to about 300,000 Daltons, or about 60,000 to about 150,000 Daltons; and a second PVA polymer that has a Mw in a range of about 60,000 to about 300,000 Daltons, or about 80,000 to about 250,000 Daltons. Of the total PVA resin content in the film described herein, the PVA resin can comprise about 30 to about 85 wt % of the first PVA polymer, or about 45 to about 55 wt % of the first PVA polymer. For example, the PVA resin can contain about 50 w. % of each PVA polymer, wherein the viscosity of the first PVA polymer is about 13 cP and the viscosity of the second PVA polymer is about 23 cP. Further details regarding films that may be employed in embodiments of the invention may be found in U.S. Pat. No. 9,988,595; the disclosure of which is herein incorporated by reference Other adsorbing agents that may be employed instead of, or in addition to, activated carbon, include but are not limited to clays, including natural and synthetic clays, such as but not limited to: kaolin, talc, smectite, vermiculite, mica, chlorite, sepeolite and sodium magnesium silicate, etc.

In addition or alternatively to adsorbing agents, e.g., as described above, the pharmacological agent activity mitigation component may be a sequestering agent, e.g., an agent which serves to isolate an API in some manner so that it is not available. In some instances, the sequestering agent is one that forms a mass upon mixing with a solvent, e.g., an aqueous liquid, such as water, i.e., where the formed mass may be a highly viscous mass, if not a solid. In those embodiments where a highly viscous mass is produced, the viscosity may vary but in some instances is 25,000 cps or greater, e.g., 50,000 cps or greater, 100,000 cps or greater, 250,000 cps or greater, ranging in some instances from 100,000 to 100,000,000 cps. In such embodiments, sequestering agents of interest include polymeric materials. Polymers, copolymers or derivatives thereof suitable for use as sequestering agents include, but are not limited to: polysaccharides, e.g., gums, including synthetic and natural gums, such as xanthum, guar and carragum gums, celluloses, cellulose ethers, cellulose esters, cellulose amides, such as methylcellulose, carboxymethylcellulose sodium, dextrin, ethylcellulose, hydroxyethyl cellulose, hydroxypropyl methylcellulose, maltodextrin, starches and gelatins, acrylic acid and polyacrylates, including acrylate copolymers (such as copolymers of maleic/acrylic acids), polymethacrylates, sodium polyacrylates, Carbomers, etc., as well as polyvinyl acetates, polycarboxylic acids and salts, polyaminoacids or peptides, polyamides, polyacrylamide, polyvinyl alcohols, polyvinyl alcohol copolymers polyvinyl pyrrolidone, polyalkylene oxides, etc. In such instances, the polymeric sequestering agent can have any weight average molecular weight, such as from 1000 to 1,000,000, e.g., from 10,000 to 300,000, including from 20,000 to 150,000. Mixtures of polymers can also be used as the pouch material.

In addition to or instead of the above adsorbing and sequestering agents, the pharmacological agent activity mitigation component may include other substances which in some way render the active agent (i.e., API) of the pharmaceutical composition unusable. Accordingly, the pharmacological agent activity mitigation component may contain one or more of a taste deterrent, an antagonist, an irritant compound, an oxidizing compound, or an anti-abuse distressing agent. Such compounds may be used singly or in combination as desired. Examples of taste deterrents include denatonium benzoate, sucrose octaacetate and capsaicin. Antagonists of interest are those which exhibit antagonist activity relative to the active agent of the pharmaceutical composition, e.g., naloxone or naltrexone for opioids. An example of an irritant compound is ipecac. Examples of oxidizing agents include perborates, percarbonates, peroxides, and hypochlorites. Examples of irritant compounds include ipecac. Examples of anti-abuse distressing agents include bitter taste agents, such as dehydrocholic acid. When used in combination with other agents, such compounds may be complexed with the other agents, as desired.

The amount of the pharmacological agent activity mitigation component in the container may vary, and may be selected to be more than theoretically required to substantially inactivate the amount of active agent in the pharmaceutical composition for which the device has been configured. While the exact amount may vary, in some instances the weight ratio of pharmacological agent activity mitigation component (e.g., activated carbon) to active agent is 2 (i.e., 2/1) or higher, such as 3 or higher, including 4 or higher, such as 5 or higher.

In some instances, the pharmacological agent activity mitigation component is not free-flowing inside of the container. In other words, the pharmacological agent activity mitigation component is stably associated with some other component of the container, e.g., an inside wall of the container, a support present in the container, a liquid permeable pouch inside of the container, etc. By "stably associated" is meant that the pharmacological agent activity mitigation component is immobilized relative to the other component at least prior to use of the container, e.g., prior to inclusion of liquid in the container. As such, in some instances the pharmacological agent activity mitigation component may be adhered to an inner surface of the container, e.g., as a layer on the inner surface of the container. Where desired, a liquid permeable cover (i.e., liner) may be positioned over the pharmacological agent activity mitigation component. In other embodiments, a support (e.g., a flexible or rigid, permeable or impermeable, solid structure) may be provided inside of the container and unattached to the container, where the pharmacological agent activity mitigation component is stably associated with one or more surfaces of the support.

In some instances, pharmacological agent activity mitigation component may be present in a liquid, e.g., water, permeable enclosure (such as a pouch), which enclosure allows for liquid to pass into the inside of the enclosure but holds the contents of the enclosure inside of the enclosure, at least prior to contact with liquid. In some instances, the enclosure is fabricated from a water permeable material which maintains the inactivating substance inside of the enclosure after the enclosure has been contacted with liquid. Any convenient material may be employed for the inner enclosure, including materials commonly employed for tea bags, e.g., cellulose materials, etc. The inner enclosure may or may not be joined to the container.

The spatial relationship of the various components, e.g., blister pack, container and pharmacological agent activity mitigation component, may vary as desired. For example, the blister pack and the pharmacological agent activity mitigation component may both be present inside of the container. Alternatively, one or both of the blister pack and the pharmacological agent activity mitigation component may be separate from the container, e.g., where the components are positioned separately within another container, such as a packaging, e.g., a box or pouch, housing the blister pack, container and pharmacological agent activity mitigation component.

Figure 1:
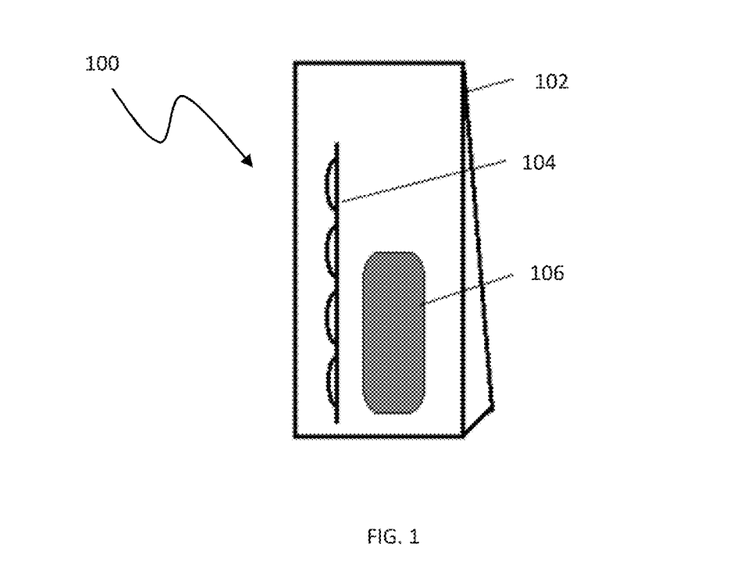
FIG. 1 provides a view of an embodiment of the invention that includes a pouch housing a blister pack and a pharmacological agent activity mitigation component in the form of an activated carbon pod.
Figure 2:
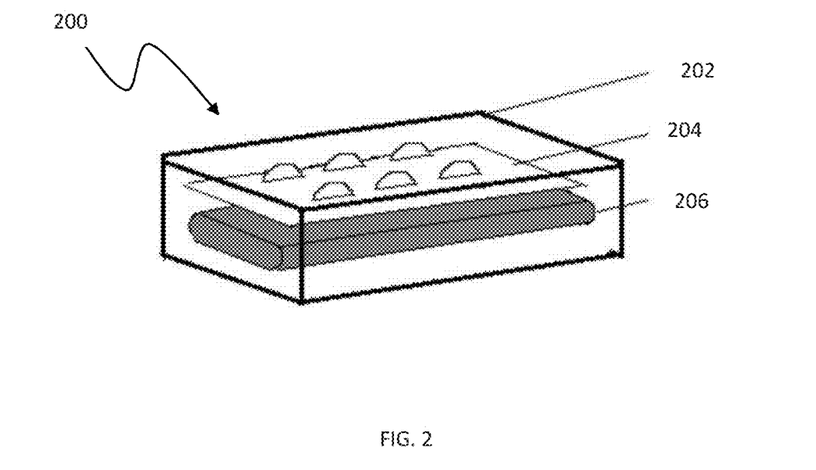
FIG. 2 provides a view of an embodiment of the invention that includes a box housing a blister pack and a pharmacological agent activity mitigation component in the form of an activated carbon pod.

FIG. 1 provides a view of an embodiment of a composition of the invention. As shown in FIG. 1, the composition 100 includes a pouch 102 housing a blister pack 104 and a pharmacological agent activity mitigation component in the form of an activated carbon pod 106. FIG. 2 provides a view of an embodiment of another composition of the invention. As shown in FIG. 2, the composition 200 includes a box 202 housing a blister pack 204 and a pharmacological agent activity mitigation component in the form of an activated carbon pod 206.

Methods

As summarized above, aspects of the invention include methods of employing the compositions, e.g., to dispose of blister pack and unused pharmacological compositions thereof. Aspects of the methods include providing a blister pack in a container that also includes a pharmacological agent activity mitigation component. Depending on the embodiment, the provided container that includes both the blister pack and the pharmacological agent activity mitigation component may be provided using any convenient protocol. For example, in those embodiments (such as described above) where the pharmacological agent activity mitigation component is present in a container, a to be disposed of blister pack may be introduced into the container. Alternatively, in those embodiments where the blister pack is present in a container, the pharmacological agent activity mitigation component may be introduced into the container. Where neither the blister pack nor the pharmacological agent activity mitigation component are initial present in the container, the method may include positioning both the blister pack and the pharmacological agent activity mitigation component into the container.

Following provision of the container that includes both the blister pack and the pharmacological agent activity mitigation component present therein, an amount of liquid, such as an aqueous liquid, e.g., water (such as tap water) is introduced into the container such that the pharmaceutical composition and active agent thereof combines with the pharmacological agent activity mitigation component. The amount of liquid that is introduced into the container may vary, and in some instances is an amount sufficient to occupy 10% or more of the void space of the container, such as 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, including up to 100% of the void space of the container. The liquid may be introduced into the container using any convenient protocol, such as holding an opening of the container under a tap. Depending on the nature of the blister pack, the method may include provided for liquid passage into the interior of blister compartments that include pharmaceutical compositions. In some such instances, one or more holes through the backing and/or blister components may be made to provide for liquid passage from the exterior to the interior of the blister pack compartments. In those embodiments where the blister pack includes one or more water-soluble components, such as described above, this step may be performed.

After the liquid has been introduced into the container, the container may be sealed. The container may be sealed using any convenient protocol, which may depend in part on the nature of the container. For example, where the container includes a ZIPLOC® seal, this step may include sealing the ZIPLOC® seal by compressing the components of the seal together from one side of the seal to the other. In embodiments where the seal is an adhesive seal, this step may include pressing the adhesive components of the seal together.

Where desired, the contents of the sealed container may be mixed, e.g., by agitating the container, manipulating the container if the container is flexible, etc. However, in some instances, the method does not comprise any mixing of the contents of the container following sealing of the container. In some instances, the container may be maintained for a storage period prior to ultimate disposal of the container, e.g., in a municipal sanitation system. When employed, the container may be stored for a period ranging from 1 day to 2 weeks, e.g., 1 to 7 days. During storage, the container may be maintained at any convenient temperature, e.g., room temperature.

Also provided are methods of making compositions according to embodiments of the invention. Such methods of making may include positioning a blister pack, a container and a pharmacological agent activity mitigation component into a packaging, such as a box. With the packaging, the blister pack and/or the pharmacological agent activity mitigation component may be positioned in the container, e.g., as described above.

Utility

The compositions and methods of the invention, e.g., as described above, find use in disposal of a variety of different types of blister pack pharmaceutical compositions, e.g., where the pharmaceutical compositions may be liquids or solids, where solid pharmaceutical compositions may be pills (i.e., tablets), capsules, etc., among other forms, which are present in compartments of a blister pack. Methods and devices of the invention find use is disposing any type of active agent, including those that may be subject to abuse, e.g., opioids and other painkillers, hormones, etc., in a manner that prevents abuse and is environmentally sound (e.g., in that it prevents the active agent from entering the ecosystem).

Kits

Kits for use in practicing certain methods described herein are also provided. In certain embodiments, the kits include one or more compositions as described above. For example, the kits may include a container, such as a pouch or box, and an amount of a pharmacological agent activity mitigation component, e.g., in the form of a carbon pod. These components may or may not be combined, e.g., where the carbon pod is present in the pouch, and may or may not be present in combination with a blister pack, e.g., where the pouch and carbon pod are present in the blister pack box. In certain embodiments, the kits include additional components that find use in the methods, e.g., an amount of liquid, e.g., water, for introducing into the container etc., as described above. In a given kit that includes two or more compositions, the compositions may be individually packaged or present within a common container, as desired.

In certain embodiments, the kits will further include instructions for practicing the subject methods or means for obtaining the same (e.g., a website URL directing the user to a webpage which provides the instructions), where these instructions may be printed on a substrate, where substrate may be one or more of: a package insert, the packaging, reagent containers and the like. In the subject kits, the one or more components are present in the same or different containers, as may be convenient or desirable.

The following examples are offered by way of illustration and not by way of limitation. Specifically, the following examples are of specific embodiments for carrying out the present invention. The examples are for illustrative purposes only, and are not intended to limit the scope of the present invention in any way.

EXAMPLES

I. Pouch Including a Carbon Pod

A water impermeable sealable pouch dimensioned to hold a 16-tablet blister pack is provided with a carbon pod (1.5×2.5×0.5"). The pod has 16 grams of activated carbon (Cabot Corporation) which is sufficient to treat 10 unused and to be disposed of tablets at a ratio of 4 grams of carbon for every gram of organic to be adsorbed. The carbon is encased in a water soluble PVA film (Multi Pack Solutions, Mt. Prospect, Ill.). During use, a partially used blister pack having a water-soluble blister and/or backing, e.g., as described above, and up to 10 unused tablets is placed in the pouch along with a volume of water sufficient to immerse the blister pack. Immersion of the blister pack in the water dissolves the blister and/or backing components, releasing the active agents from the unused tablets, which activate agents are then adsorbed by the carbon pod.

II. Blister Pack Box Including a Carbon Pod

A 3×5" box containing a blister pack having 10 tablets with total 4 grams adsorbable organics employs 16 grams carbon. A 4×6" pouch containing a low profile carbon pod is folded and inserted in the box, where the carbon pod has dimensions of 0.25×2.5×3". During use, a partially used blister pack having a water-soluble blister and/or backing, e.g., as described above, and up to 10 unused tablets is placed in the pouch provided in the box along with a volume of water sufficient to immerse the blister pack. Immersion of the blister pack in the water dissolves the blister and/or backing components, releasing the active agents from the unused tablets, which activate agents are then adsorbed by the carbon pod.

III. Customizable Systems

Custom sized pouches containing custom sized carbon pods that are shipped and provided separately to pharmacies/pharmacy benefit managers (PBMs) may be employed, and combined by a pharmacy or PBM in order to provide a suitable system, such as described in Examples I and II above.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method comprising:
    providing a container comprising a pharmacological agent activity mitigation component comprising an adsorbing agent;
    positioning a blister pack containing a water-soluble component and comprising a plurality of sealed compartments each containing a pharmaceutical composition comprising an active pharmaceutical ingredient into the container; and
    introducing an aqueous liquid into the container.
2. The method according to claim 1, wherein the aqueous liquid comprises water.
3. The method according to claim 1, wherein the method further comprises sealing the container.
4. The method according to claim 1, wherein the method further comprises disposing the container.
5. The method according to claim 1, wherein the blister pack is partially used.

* * * * *